United States Patent [19]
Porter

[11] 3,762,724
[45] Oct. 2, 1973

[54] SHAFT SEALS
[75] Inventor: Robert J. Porter, Mansfield, Ohio
[73] Assignee: The Gorman-Rupp Company, Mansfield, Ohio
[22] Filed: Mar. 8, 1971
[21] Appl. No.: 121,958

[52] U.S. Cl. ........................ 277/21, 277/87, 277/92
[51] Int. Cl. ...... F16j 15/36, F16j 15/38, F16j 15/34
[58] Field of Search .................. 277/21, 87, 91, 92, 277/65, 59, 74, 17, 85

[56] References Cited
UNITED STATES PATENTS
| | | | |
|---|---|---|---|
| 2,503,086 | 4/1950 | Albright | 277/87 |
| 2,243,227 | 5/1941 | Stratton | 277/21 |
| 3,447,810 | 6/1969 | Porter | 277/92 X |

FOREIGN PATENTS OR APPLICATIONS
379,210   8/1932   Great Britain .................... 277/96

*Primary Examiner*—Samuel B. Rothberg
*Attorney*—Watts, Hoffmann, Fisher & Heinke

[57] ABSTRACT

An oil lubricated, face-type shaft seal including a pair of cooperating abrasion-resistant seal rings disposed around a rotatable shaft extending within a shaft opening of a housing structure, an oil seal around the shaft closing the opening at a location spaced from the seal rings, and a source of oil communicating with a chamber between the oil seal and the seal rings for lubricating the mating faces of the rings.

4 Claims, 2 Drawing Figures

PATENTED OCT 2 1973

3,762,724

INVENTOR.
ROBERT J. PORTER
BY Watts, Hoffmann,
Fisher & Heinke
ATTORNEYS.

SHAFT SEALS

BACKGROUND OF THE INVENTION

This invention relates generally to the seal art, and more specifically to a new face-type shaft seal assembly which is especially suited for use in pumps.

Pumps and similar equipment which include rotating shafts have been provided with seals of various types to prevent leakage along the shafts. One conventional type of seal is known as a face seal. A typical face seal comprises an assembly which is rotatable with the shaft and which includes a seal ring presenting a radial seal face surrounding the shaft. The seal face of the rotating ring bears against a radial seal face of a non-rotating ring. In a typical pump installation, the seal assembly is fitted into a component part of the pump, such as a seal housing, and the radial sealing faces of the rings are maintained in engagement by a coil spring or the like.

Most of the conventional shaft seal assemblies as described above are short-lived when subjected to the severe operating conditions of apparatus such as centrifugal pumps and must be frequently replaced. A primary cause of seal failures in centrifugal pumps is believed to be cavitation. Cavitation produces severe hydraulic shocks which are transmitted through the incompressible liquid to all parts of the pump, including the shaft seal. The hydraulic shock waves force the seal rings together and cause impacting or chattering of the rotating seal face against the non-rotating seal face. The impact pressures caused by cavitation are substantial. For example, it has been shown that cavitation in water produces impact pressures of approximately 80,000 psi. With conventional seals, these pressures are sufficient to cause the rotating ring to seize on the non-rotating ring so that metal is removed from both seal faces to form striations or grooves which destroy the lapped finishes of the faces. These formations can occur within a relatively few hours of pump operation, thereby requiring the pump to be shut down so that the seal rings can be replaced.

SUMMARY OF THE INVENTION

The new face-type shaft seal assembly of the present invention is constructed to provide for the supply of oil to the mating faces of the rotating and non-rotating seal rings. The improved manner of lubricating the seal rings reduces wear and increases the life of the seal. Among other advantages, the new seal can be easily incorporated into existing pumps and is completely interchangeable with conventional grease-lubricated face seal arrangements.

In the preferred embodiment contemplated by the invention, the new seal assembly comprises a seal ring which is mounted for rotation with a shaft extending within a shaft opening. A cooperating, non-rotating seal ring is carried by a member which surrounds the shaft in radially spaced relation and which is movable axially of the shaft. A flexible seal is disposed around the member in sealing engagement with the wall of the shaft opening, and an oil seal surrounds the shaft and closes the opening at a location spaced from the flexible seal. Oil is supplied to the chamber between the oil seal and the flexible seal so that in operation the oil can flow along the shaft to the mating faces of the seal rings.

Each of the cooperating seal rings is made of an abrasion-resistant material, such as tungsten carbide or the like, so that the seal can readily withstand the severe operating conditions encountered in centrifugal pumps and similar apparatus. The abrasion-resistant seal rings can be individually replaced when maintenance of the seal assembly is required.

Other advantages and a fuller understanding of the invention will be had from the following detailed description when taken in conjunction with the accompanying drawings.

DESCRIPTION OF THE PREFERRED EMBODIMENT

Figure 1:
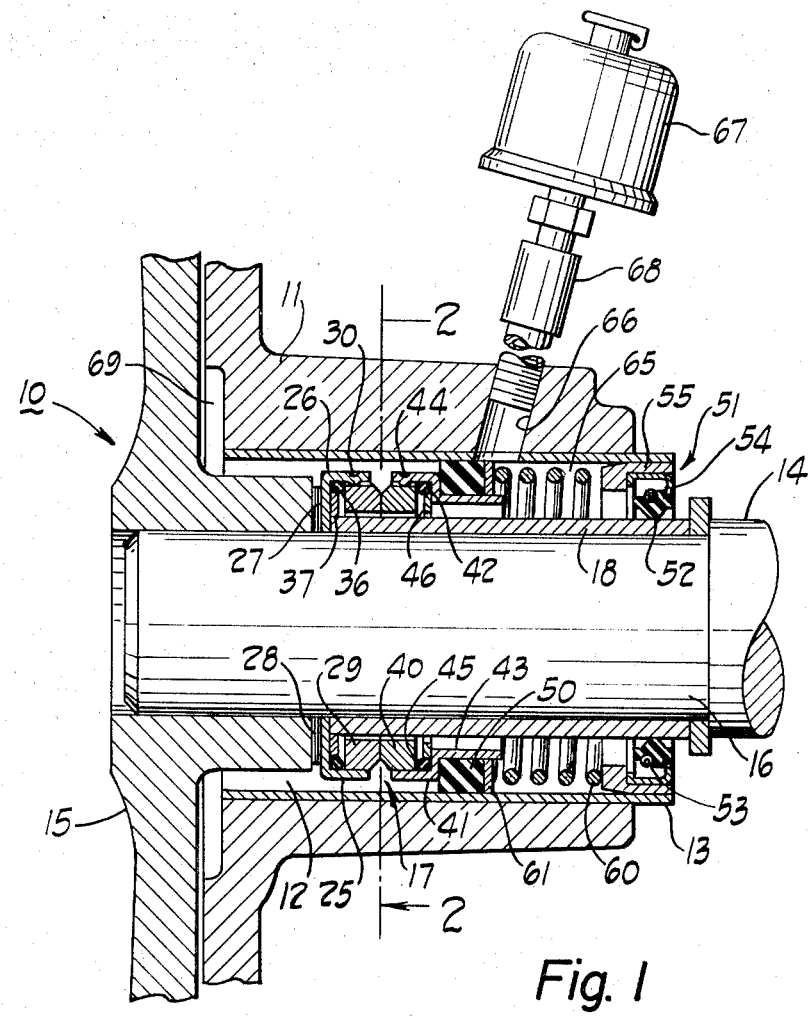
FIG. 1 is a cross-sectional view illustrating the new seal provided by this invention.

Referring now to the drawing, there is shown a portion of a centrifugal pump 10 which includes a stationary seal housing 11 having a shaft opening 12 and a seal liner 13 which is fitted into the opening. A rotatable shaft 14 extends within the shaft opening 12, and a rotatable impeller 15 is fixed on a reduced end portion 16 of the shaft. The shaft seal assembly of this invention is generally designated by reference numeral 17 and is mounted in the seal housing 11 around a sleeve 18. The sleeve 18 is engaged on the end portion 16 and forms a part of the shaft 14.

The face-type shaft seal 17 comprises a seal ring holder 25 having a side wall 26 and a bottom wall 27 which define a cup-shaped recess. The holder 25 is mounted for rotation with the shaft 14 between an end of the sleeve 18 and a ring 28 which engages the hub of the impeller 15.

Figure 2:
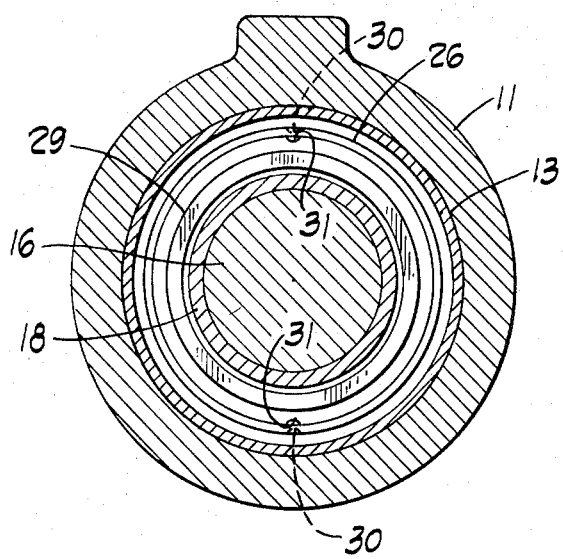
FIG. 2 is a cross-sectional view taken along the line 2—2 of FIG. 1.

A seal ring 29 is mounted in the cup-shaped recess of the holder 25. As is best shown in FIG. 2, the side wall 26 of the holder 25 is indented inwardly at a plurality of circumferentially spaced locations 30. The outer surface of the ring 29 is provided with a corresponding number of circumferentially spaced, axially extending grooves 31 which receive the indented portions 30 to prevent the ring from rotating relative to the holder. The cooperating indented portions and groove arrangement permits the ring 29 to be inserted into and removed from the recess of the holder 25. An O-ring 36 is fitted into the recess of the holder 25 and engages the rear face of the ring 29. A rigid ring 37 is mounted in the bottom of the holder 25 and maintains the O-ring 36 adjacent the inner surface of the side wall 26.

The rotating seal ring 29 bears against a non-rotating seal ring 40. Both of the seal rings 29, 40 are preferably made of a hard, wear and abrasion-resistant material such as tungsten carbide or the like which greatly improves the life of the seal.

The ring 40 is carried in a recess defined by a side wall 41 and a radial wall 42 of a tubular member 43. The side wall 41 is indented at a plurality of locations 44 (only one of which is shown) in the same manner as the side wall 26 of the holder 25, and the outer surface of the ring 40 is formed with circumferentially spaced, axially extending grooves which receive the indented portions to prevent the ring 40 from rotating relative to the member 43. An O-ring 45 is mounted in the recess of the member 43 against the rear face of the ring 40. The O-ring 45 is held in engagement with the inner surface of the side wall 41 by a rigid ring 46 which bears against the radial wall 42.

A resiliently flexible seal 50, which is illustrated as being of rectangular cross-section, is mounted around the outside of the tubular member 43 in engagement with the seal liner 13. An oil seal 51 is mounted around the shaft 14 and closes the opening 12 at a location spaced from the flexible seal 50. As shown, the oil seal 51 comprises a flexible seal member 52 which is banded against the sleeve 18 by a spring 53. The seal member 52 is held in place by a retainer 54 which is carried by a member 55 fitted tightly in the end of the liner 13.

The tubular member 43 is urged axially of the shaft 14 by a coil spring 60 to maintain the cooperating faces of the seal rings 29, 40 in engagement. The coil spring 60 is illustrated as being engaged between an end of the member 55 and a plate 61 which projects radially from the member 43 against the flexible seal 50.

The flexible seal 50 and the oil seal 51 cooperate to define an oil chamber 65. The chamber 65 communicates with the mating faces of the rings 29, 40 through the interior of the tubular body 43 and the rings 40, 46 which are radially spaced from the sleeve 18. In accordance with the present invention, the bearing housing 11 is formed with an oil passage 66 which communicates with the chamber 65. An oiler or oil reservoir 67 is connected to the passageway 65 by conduit structure 68.

When the new seal has been installed in the pump such as indicated at 10 and the pump is in operation, it will be understood that the liquid being handled enters the seal housing 11 through the space 69 behind the impeller 15. This liquid in the seal housing is prevented from leaking along the shaft 14 by the seal rings 29, 40. The flexible seal 50 prevents the liquid from flowing around the member 43 into the oil-filled chamber 65. The oil in the chamber 65 supplied from the oiler 67 flows through the tubular member 43 around the sleeve 18 and serves to lubricate the mating faces of the seal rings 29, 40. It will thus be apparent that the described construction provides for a constant supply of oil to the engaged faces of the seal rings 29, 40 in a manner which effectively reduces wear.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What is claimed is:
1. In combination:
  a. structure having a shaft opening,
  b. rotatable shaft means extending within said opening,
  c. a holder mounted for rotation with said shaft means,
  d. said holder defining a cup-shaped recess having a circumferentially extending side wall and an annular end wall,
  e. a first abrasion-resistant seal ring mounted in said cup-shaped recess of said holder and surrounding said shaft means in radially spaced relation,
  f. a member disposed around said shaft means in radially spaced relation and movable axially thereof,
  g. said member defining a recess having a circumferential side wall and a generally radially extending wall,
  h. a second abrasion-resistant seal ring mounted in said recess of said member and surrounding said shaft means in radially spaced relation,
  i. said first and second rings presenting annular seal faces concentric with respect to said shaft means,
  j. a flexible seal mounted within said opening in sealing engagement between said member and said structure,
  k. spring means acting on said member for urging it axially relative to said shaft means to establish a sealing relationship between said annular seal faces of said first and second seal rings,
  l. oil seal means mounted around said shaft means and closing said opening at a location spaced from said flexible seal,
  m. said oil seal means including a flexible annular seal ring and a cooperating retainer fitted in said opening in engagement with the surrounding wall of said structure and in sealing contact with said shaft means,
  n. said structure having lubricant passageway means communicating with the space between said flexible seal and said oil seal means, and
  o. lubricant supply means connected to said passageway means.

2. The combination as claimed in claim 1 wherein said flexible annular seal ring of said oil seal means is banded against said shaft means, and wherein said retainer is engaged in said opening to hold said flexible annular seal ring in position.

3. The combination as claimed in claim 1 wherein the assembly of said holder and said first abrasion-resistant seal ring and the assembly of said member and said second abrasion-resistant seal ring each includes cooperating means for preventing rotation of said first and second rings in said recesses and for permitting said rings to be inserted into and removed from said recesses.

4. The combination as claimed in claim 1 further comprising a first O-ring positioned in said recess of said holder in sealing engagement between said holder and a face of said first seal ring, positioning means for maintaining said first O-ring in said position, a second O-ring positioned in said recess defined by said member in sealing engagement between said second seal ring and said member, and positioning means for maintaining said second O-ring between said second seal ring and said member.

* * * * *